June 14, 1966 W. C. HOWE 3,256,051
BALL BEARING RETAINER AND METHOD OF MAKING SAME
Filed Sept. 8, 1964
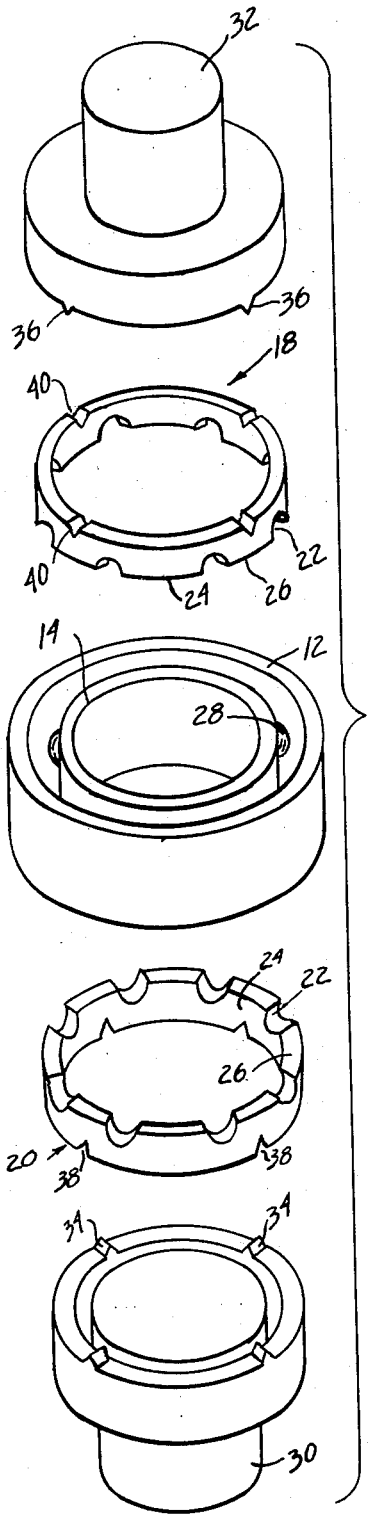
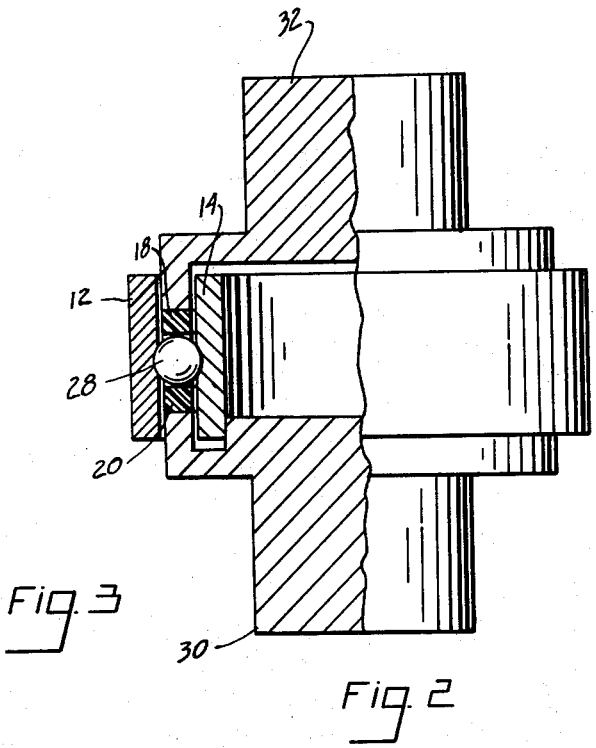
Fig. 3
Fig. 2
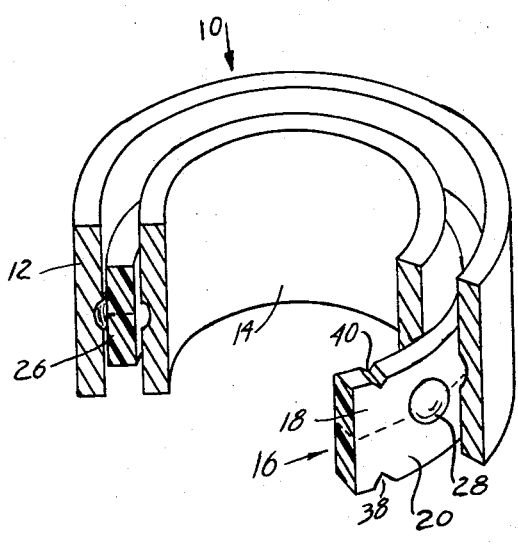
Fig. 1

United States Patent Office 3,256,051
Patented June 14, 1966

3,256,051
BALL BEARING RETAINER AND METHOD OF MAKING SAME
Wesley Charles Howe, Jaffrey, N.H., assignor to New Hampshire Ball Bearings, Inc., Peterborough, N.H., a corporation of New Hampshire
Filed Sept. 8, 1964, Ser. No. 394,742
4 Claims. (Cl. 308—201)

This invention relates to ball bearings and more particularly to ball bearings and methods of manufacture utilizing an improved unitary retainer or cage element.

In the manufacture of ball bearings, it is customary to insert the balls between the inner and outer races by holding the two races eccentrically. The races are then moved to a concentric relationship by spacing the balls and some type of retainer or cage inserted between the two races to hold the balls in their spaced relationship. There are three distinct types of retainers previously used in ball bearing construction; one piece retainers with one side open for ease of assembly, one piece retainers in which the balls are snap fitted into the raceways and two piece retainers in which the two portions are mechanically secured together after assembly.

A one piece open sided retainer is assembled by snapping the retainer over the balls which have been previously spaced between the races. It has a distinct disadvantage in that it presents an out of balance condition detrimental to the performance of a precise critical bearing. A bearing using this style of retainer does not have the raceways relieved for assembly purposes and thus has the advantage of accepting axial loads in either direction.

A one piece retainer without an open face is best suited for use in bearings which may be assembled after the balls are placed in spaced relationship in the retainer. It cannot be easily used in bearings in which the balls cannot be spaced until after they have been placed between the races. It has the advantage of having a balanced weight relationship but due to the necessity of relieving one or more of the races for assembly purposes can accept axial loading in one direction only.

In bearings in which two-piece retainers must be used, the two portions of the retainer are placed in position after the balls have been spaced and then secured together. The prior art shows that they may be secured by means of bendable ears, bolts, rivets or the like. It also shows that if the two portions are made of metal, they may be welded. Metal welding, however, necessarily requires high temperatures and is almost impossible to accomplish without some damage to the other elements of the bearing, either through distortion or by exceeding the tempering temperature of the races or balls. The problem is especially acute in the manufacture of extremely accurate or miniature bearings. If the two halves of the retainer are mechanically secured, the high temperature problems are avoided, but only at the cost of a more cumbersome or less accurate method of joinder without the benefit of having an integral one piece retainer.

An object of the present invention is to provide an integral, one-piece, self-lubricating retainer designed for use in ball bearings in which the balls must be spaced after they have been placed between the races.

Another object is to provide a unitary thermoplastic retainer element and method of assembly which makes it possible to construct a balanced, unitary retainer and a bearing which can accept axial loading from either direction.

I have discovered that it is possible to accomplish the above-mentioned objects by inserting a plurality of organic thermoplastic rings between the races of a ball bearing after the balls have been placed in spaced relationship and then using ultrasonic welding to accurately and quickly fuse the rings together without overheating or distorting any portion of the bearing, thereby producing a thermally fused, integral unitary thermoplastic retainer.

For a fuller understanding of the nature and objects of the present invention, reference should be had to the following detailed description of a preferred embodiment thereof taken in conjunction with the accompanying drawings wherein:

FIG. 1 is a fragmentary perspective view, partially in section, showing a ball bearing constructed according to the invention;

FIG. 2 is a transverse vertical view, partially in section, of a ball bearing and container constructed according to the present invention together with means for joining the two portions of the retainer; and, FIG. 3 is an exploded perspective view of the apparatus of FIG. 2.

Reference is now made to the drawings wherein is illustrated one form of ball bearing 10 embodying the present invention. The bearing comprises a cylindrical outer race 12, a cylindrical inner race 14, and a retainer 16 having an outside diameter less than the inner diameter of outer race 12 and an inside diameter greater than the outside diameter of inner race 14. The retainer comprises an upper portion 18 and a lower portion 20. Each portion comprises an annular ring having a number of semi-circular or spherical, axially-facing ball pockets 22 and an axially extending shoulder 24 between each pair of pockets. When the two portions are placed with the ball pockets in face-to-face relationship and the axially facing surfaces 26 of the shoulders 24 of portion 18 firmly seated upon the corresponding surfaces 26 of portion 20, as shown in FIGS. 1 and 2, the ball pockets 22 partially surround and form a seat for the balls 28 of the bearing. The general construction of the races, retainers, and balls of such bearings is well known in the art.

The present invention, which calls for ultrasonically welding a plurality of annular rings to form a unitary, thermally fused thermoplastic retainer, avoids the problems of high temperature, provides a simple, and inexpensive method of joinder and produces strong balanced retainers which are especially suited for use in bearings which must accept an axial load in either direction or when the dimensions of the various elements of the bearing are crucial. Only the present invention provides a unitary, thermoplastic, balanced retainer in bearings in which the balls must be spaced after they have been placed between the races. As illustrated, each portion of the retainer originally comprises an organic thermoplastic annular ring. These rings may be manufactured, typically molded, quickly, inexpensively and, most importantly, accurately. It is usually desirable, though not absolutely necessary, that they be made of a self-lubricating material. The advantages of using plastic retainers, as opposed to metal, both in terms of ease of manufacture, light weight, and to obtain self-lubrication, should be evident. Plastic retainers have not been widely used in the past, however, because of the difficulties involved in accurately and inexpensively securing them together. By ultrasonically joining the two portions to form a unitary thermoplastic retainer, these difficulties are overcome. A thermoplastic, as opposed to thermosetting, material is required because only the former is susceptible to ultrasonic welding. The specific thermoplastic material used depends on the specific purpose for which the bearing will be used.

The annular rings comprising the retainer are assembled and thermally fused together using the support base 30 and ultrasonic horn tip 32 illustrated in FIGS. 2 and 3. The support base 30 and horn tip 32 include orientation ribs 34 and 36, respectively, adapted for engaging, respectively, orientation notches 38 on portion 20 and notches 40 on portion 18 to accurately position the rings prior to joinder. A typical sequence of operations for assembling the bearing and retainer is as follows:

(1) Portion 20 is accurately placed on support base 30 (using the orientation notches and ribs) with ball pockets 22 and surfaces 26 facing upward;

(2) The preassembled inner race 14, outer race 12, and balls 28 are placed over the retainer with the balls 28 seated in the ball pockets 22;

(3) Portion 18 is placed over the balls;

(4) The ultrasonic horn tip 32 is accurately placed on portion 18 using the orientation notches and ribs; and, (5) The engaged surfaces 26 of the two portions are ultrasonically welded together to form a unitary, thermally fused retainer.

In the ultrasonic welding process only the interface between the portions is heated. The retainer will not be significantly distorted even if pressure is applied to make the actual weld. Similarly, the amount of heat transmitted to the other elements of the bearing is exceedingly small, and there is no chance that the tempering temperature of those elements will be exceeded. The major characteristic of the thermally fused retainer, however, is that the annular rings comprising it form an integral, unitary element. The ultrasonically welded thermoplastic "joint" between the rings is the strongest part of the unitary retainer.

Since certain changes may be made in the above method and device without departing from the scope of the invention herein involved, it is intended that all matter contained in the above description or shown in the accompanying drawings shall be interpreted as illustrative and not in a limiting sense.

What is claimed is:

1. A unitary, organic thermoplastic ball bearing retainer
    comprising first and second annular ball retainer portions, at least one of which includes a plurality of axially extending shoulders engaging and ultrasonically welded to the other of said portions to provide a plurality of spaced ball pockets around a plurality of balls circumferentially spaced intermediate the inner and outer races of a ball bearing and,
    formed by inserting said annular portions between the preassembled inner and outer races of said ball bearing at the opposite axial ends thereof, engaging one of said portions with a support element and the other of said portions with an ultrasonic welding element, using orientation means provided on said support and welding element to locate said portions relative to each other with said shoulders of said one portion engaging said other portion, and ultrasonically welding said portions together to form a unitary, thermally fused ball bearing retainer.

2. A unitary, organic thermoplastic ball bearing retainer
    comprising first and second annular ball retainer portions having substantially the same diameter and radial thickness, each of said retainer portions including a plurality of circumferentially spaced, axially-facing arcuate ball pockets and an axially extending shoulder between each pair of pockets, each shoulder of one of said portions engaging and ultrasonically welded to a shoulder of the other of said portions to provide a plurality of ball pockets surrounding a plurality of balls circumferentially spaced intermediate the inner and outer races of a ball bearing and,
    formed by inserting said retainer portions between the preassembled inner and outer races of said ball bearing at the opposite axial ends thereof, engaging one of said portions with a support element and the other of said portions with an ultrasonic welding element predeterminedly located relative to said support element, accurately locating said retainer portions with said ball pockets in face to face relationship and said shoulders of one of said portions engaging said shoulders the other of said portions using orientation means provided on said support and welding elements and said portions, and ultrasonically welding said portions together to form a unitary, thermally fused ball retainer.

3. The method of manufacturing a unitary, thermoplastic ball bearing retainer comprising the steps of:
    forming first and second organic, thermoplastic annular ball retainer portions at least one of which includes a plurality of axially-extending shoulders adapted for engaging and ultrasonic welding to the other of said portions,
    inserting said annular portions between the preassembled inner and outer races of a ball bearing at the opposite axial ends thereof;
    engaging one of said portions with a support element and the other of said portions with an ultrasonic welding element predeterminedly located relative to said support element;
    accurately locating said portions relative to each other with said shoulders of said one portion engaging said other portion using orientation means provided on said support and welding elements; and
    ultrasonically welding said portions together to form a unitary, thermally fused ball bearing retainer.

4. The method of claim 3 including the steps of:
    forming first and second organic, thermoplastic annular ball retainer portions which have substantially the same diameter and radial thickness and each of which includes a plurality of circumferentially spaced axially-facing arcuate ball pockets and an axially extending shoulder between each pair of pockets; and,
    accurately locating said portions relative to each other with said ball pockets in face-to-face relationship and each shoulder of one of said portions engaging a shoulder of the other of said portions.

References Cited by the Examiner

UNITED STATES PATENTS

| | | | |
|---|---|---|---|
| 1,733,673 | 10/1929 | Rouanet | 308—201 |
| 2,426,650 | 9/1947 | Sivian | 29—503 |
| 2,468,171 | 4/1949 | Carlson | 308—201 X |
| 2,522,082 | 9/1950 | Arnold | 264—22 |

FOREIGN PATENTS 264,465   2/1927   Great Britain.

WHITMORE A. WILTZ, *Primary Examiner.*

THOMAS H. EAGER, *Examiner.*